United States Patent Office 3,527,814
Patented Sept. 8, 1970

3,527,814
HALOMETHYL FLUOROISOPROPYL ETHERS
Louise S. Croix, Summit, and Alex J. Szur, North Plainfield, N.J., assignors to Air Reduction Company, Incorporated, New York, N.Y., a corporation of New York
No Drawing. Original application Dec. 8, 1966, Ser. No. 600,014. Divided and this application Mar. 8, 1968, Ser. No. 735,939
Int. Cl. C07c 43/00, 43/12
U.S. Cl. 260—614                5 Claims

ABSTRACT OF THE DISCLOSURE

This invention relates to certain novel halogenated derivatives of fluorinated isopropyl methyl ethers represented by the following formula:

$$\begin{array}{c} CF_2X \\ \phantom{CF_2}\diagdown \\ \phantom{CF_2XX}CHOCY'Y'' \\ \phantom{CF_2}\diagup \\ CF_2X' \end{array}$$

where X and X' can be Cl or F, Y is selected from the group consisting of F and Cl, and Y' and Y'' are selected from the group consisting of H, Cl and F. The compounds can be prepared by clorinating and fluorinating the corresponding haloisopropyl methyl ethers. The compounds are useful as solvents and dispersants for fluorinated materials and the compounds $CF_3(CF_2Cl)CHOCH_2Cl$ and $(CF_3)_2CHOCH_2Cl$ exhibit anesthetic properties in mammals.

CROSS-REFERENCE TO RELATED APPLICATION

This is a division of copending application Ser. No. 600,014 filed Dec. 8, 1966 for Halomethyl Fluoroisopropyl Ethers.

This invention relates to certain novel halogenated derivatives of fluorinated isopropyl methyl ethers, more particularly to ethers represented by the following formula:

$$\begin{array}{c} CF_2X \\ \phantom{CF_2}\diagdown \\ \phantom{CF_2XX}CH\text{—}O\text{—}CYY^1Y^{11} \\ \phantom{CF_2}\diagup \\ CF_2X^1 \end{array}$$

where X and $X^1$ may be chlorine or fluorine; and Y is selected from the group consisting of F and Cl and $Y^1$ and $Y^{11}$ are selected from the group consisting of hydrogen, chlorine and fluorine. Examples of these ethers are 1 - chloro - 1,1,3,3,3-pentafluoroisopropyl chloromethyl ether $(CF_2Cl)(CF_3)CH\text{—}O\text{—}CH_2Cl$; 1,1,1,3,3,3 - hexafluoroisopropyl chloromethyl ether $$(CF_3)_2CH\text{—}O\text{—}CH_2Cl$$

1,3 - dichloro-1,1,3,3-tetrafluoroisopropyl chloromethyl ether $(CF_2Cl)_2CHOCH_2Cl$; 1,1,1,3,3,3-hexafluoroisopropyl difluoromethyl $(CF_3)_2CHOCHF_2$; and 1,1,1,3,3,3-hexafluoroisopropyl chlorofluoromethyl ether $$(CF_3)_2CHOCHFCl$$

These ethers may be prepared in various ways. A useful method of preparing the chloromethyl derivatives is by direct chlorination of the corresponding haloisopropyl methyl ethers as illustrated by the following reaction:

$$\begin{array}{c} CF_2X \\ \phantom{CF_2}\diagdown \\ \phantom{CF_2XX}CH\text{—}O\text{—}CH_3 \\ \phantom{CF_2}\diagup \\ CF_2X^1 \end{array} \xrightarrow{Cl_2} \begin{array}{c} CF_2X \\ \phantom{CF_2}\diagdown \\ \phantom{CF_2XX}CH\text{—}O\text{—}CH_{(3-n)}Cl_n \\ \phantom{CF_2}\diagup \\ CF_2X^1 \end{array}$$

where X and $X^1$ are chlorine or fluorine, and n is 1, 2 or 3. The chlorination is readily carried out by bubbling chlorine gas through the liquid reactant at a controlled rate substantially equivalent to the rate of reaction. The mono- chloro- and polychloromethyl ether derivatives will normally both result. However, the yields of the respective chloromethyl derivatives may be controlled within limits by the amount of chlorine added to the reaction. The reaction proceeds readily in the presence of incandescent light.

The fluoromethyl derivatives are advantageously obtained by fluorinating the chloromethyl ether products prepared as described above. The fluorination advantageously is carried out by reacting the chloromethyl derivatives with a molar equivalent amount of a fluorinating agent such as antimony trifluoride or hydrogen fluoride in the presence of a catalytic amount of pentavalent fluoride or chloride such as antimony pentafluoride or antimony pentachloride.

The starting fluorinated isopropyl ethers are a new class of compounds described and claimed in the copending application or Louise S. Croix, Ser. No. 600,011 filed Dec. 8, 1966. As disclosed therein, the fluoroisopropyl methyl ethers are advantageously derived from fluoroketones such as $(CF_3)_2C\text{=}O$, $$CF_3\text{—}\underset{\underset{O}{\|}}{C}\text{—}CF_2Cl \quad \text{and} \quad CF_2Cl\text{—}\underset{\underset{O}{\|}}{C}\text{—}CF_2Cl$$

by reducing said ketones, such as by hydrogenation with $NaBH_4$, to give the corresponding alcohols which are then etherified by reaction with a methyl sulfate or halide in the presence of an alkali metal hydroxide.

The following examples illustrate the preparation of the new halomethyl ether derivatives:

EXAMPLE 1

Preparation of $CF_3(CF_2Cl)CHOCH_2Cl$ 85 g. (1.2 mole) of chlorine is slowly bubbled into a flask containing 208 g. (1.05 mole) of methyl 1-chloro-1,1,3,3,3 - pentafluoroisopropyl ether illuminated with a 250 watt incandescent lamp, starting at room temperature. The reaction proceeds exothermically with a moderate rise in temperature. The product is washed with a potassium carbonate solution until neutral, dried over $MgSO_4$ and vacuum distilled to yield 57 g. (0.23 mole) of chloromethyl 1 - chloro-1,1,3,3,3 - pentafluoroisopropyl ether, B.P. 57° C./100 mm. (116° C./750 mm.), $n_D^{20}$ 1.35519. This represents a conversion of about 22%.

EXAMPLE 2

Preparation of $(CF_3)_2CHOCH_2Cl$ 164 g. (2.31 mols) of chlorine is slowly bubbled into a flask containing 370 g. (2.03 mols) of methyl 1,1,1,3,3,3-hexafluoroisopropyl ether illuminated with a 250 watt incandescent lamp, starting at room temperature. The reaction proceeds exothermically with a moderate rise in temperature until absorption of chlorine ceases. The product is washed with a potassium carbonate solution until neutral, dried over $MgSO_4$ and vacuum distilled to yield 304 g. (1.5 mols) of chloromethyl 1,1,1,3,3,3-hexafluoroisopropyl ether, B.P. 78° C./760 mm.; $n_D^{20}$ 1.31379. This represents a conversion of about 75%.

EXAMPLES 3 and 4

Preparation of $(CF_3)_2CHOCHF_2$ and $(CF_3)_2CHOCHFCl$ 159 g. (0.63 mole) of $(CF_3)_2CHOCHCl_2$, 113 g. (0.63 mole) antimony trifluoride, and 5 drops of antimony pentachloride, approximately 0.05 wt. percent of the $SbF_3$, were added to a flask equipped with a stirrer, reflux condenser and thermometer. Upon heating the reaction commensed at 90° C. and the reaction mixture darkened, the temperature dropped to 63° C., and the mixture was refluxed for 1 hour. The products were distilled from the flask, washed with 50 ml. of 6 N HCl, and then with substantially the same quantity of a saturated potassium carbonate solution. The washed and neutralized crude product was dried over magnesium sulfate powder. Upon fractionation 5.5 g. of $(CF_3)_2CHO-CHF_2$ were obtained, B.P. 43° C./760 mm.; $n_D^{20}$ 1.26030. In addition, 31 g. of $(CF_3)_2CHOCHFCl$ were obtained from such fractionation, B.P. 68.5° C./760 mm.; $n_D^{20}$ 1.30053.

The novel halomethyl fluoroisopropyl ethers of the present invention are water insoluble, inert, non-flammable liquids, easily miscible with other organic liquids, including fats and oils, and have a faintly ethereal odor. They readily dissolve fluorocarbons and fluorowaxes and may be used to prepare pastes or dispersions useful for coatings and the like and may be used advantageously as degreasing agents. They are also useful as intermediates in the preparation of other halogenated compounds. For example, they may be dehydrohalogenated to give corresponding fluoroisopropenyl ethers by heating in a non-aqueous solvent medium, such as mineral oil, cello-solve or an excess of the ether reactant, in the presence of KOH as the dehydrohalogenating agent.

The products $CF_3(CH_2Cl)CHOCH_2Cl$ and $(CF_3)_2CHOCH_2Cl$ exhibit anesthetic properties in mammals and are each capable of inducing anesthesia in laboratory animals when admininstered by inhalation in vapor form. These agents are non-flammable and therefore lend themselves to effective use as inhalant anesthetics with oxygen or respirable mixtures containing life-supporting concentrations of oxygen by warrant of such freedom from the hazard of ignition which exists with other commonly used inhalant anesthetics.

$CF_3(CF_2Cl)CHOCH_2Cl$, for example, was administered to test mice by a standard procedure in which a measured quantity of the agent is placed in a laboratory jar and allowed completely to evaporate to give a calculated vapor concentration. The test mice are then quickly placed in the jar and observed. In such tests the agent induced anesthesia of the mice in 3.65 minutes at 0.625% vapor concentration. The induction time was reduced to 1.55 minutes at 1.25% concentration. At 0.938% concentration, induction occurred in 1.95 minutes. Recovery at the lower concentration occurred in 1.15 minutes and at the higher concentration in 8.00 minutes. Recovery at the intermediate concentration occurred in 5.20 minutes. Recovery times were measured from the time the administration of the anesthetic containing atmosphere was discontinued by removing the test mice from the test jar to room air. Light anesthesia was achieved at 0.625%, and deep anesthesia was evidenced at 0.938%. There were no delayed deaths. Analgesia appeared to be present, and muscular relaxation was very good.

Similar tests were conducted with $(CF_3)_2CHOCH_2Cl$. With this agent, induction occurred at 1.57 minutes at 1.25% concentration. Recovery occurred in 1.10 minutes. At a concentration of 2.5% induction was 1.05 minutes and recovery 7.25 minutes. The agent exhibited excellent anesthetic syndrome with smooth induction and good relaxation and analgesia. There were no visible adverse effects and no delayed deaths.

It should be understood that the foregoing disclosure relates only to a preferred embodiment of the invention and that it is intended to cover all changes and modifications of the example of the invention herein chosen for the purposes of the disclosure which does not constitute departure from the spirit and scope of the invention.

What is claimed is:

1. Halo-substituted methyl halogenated isopropyl ethers having the formula

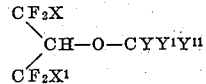

wherein X and $X^1$ are each a member of the group consisting of chlorine and fluorine, Y is a member of the group consisting of chlorine and fluorine, and $Y^1$ and $Y^{11}$ are each a member of the group consisting of hydrogen, chlorine and fluorine.

2. 1-chloro-1,1,3,3,3-pentafluoroisopropyl chloromethyl ether having the formula

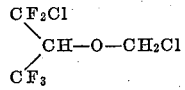

3. 1,1,1,3,3,3-hexafluoroisopropyl chloromethyl ether having the formula

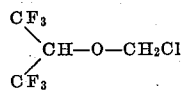

4. 1,1,1,3,3,3-hexafluoroisopropyl difluoromethyl ether having the formula

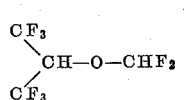

5. 1,1,1,3,3,3 - hexafluoroisopropyl chlorofluoromethyl ether having the formula

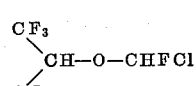

References Cited

UNITED STATES PATENTS

| | | |
|---|---|---|
| 2,574,649 | 11/1951 | McBee et al. |
| 2,803,665 | 8/1957 | Miller et al. |
| 2,803,666 | 8/1957 | Miller et al. |
| 3,331,813 | 7/1967 | Pittman et al. |
| 3,346,448 | 10/1967 | Gilbert et al. |

OTHER REFERENCES

Park et al., Jour. Amer. Chem. Soc. 76 (1954), pp. 1387–8.

Weinmayr, Jour. Org. Chem. 28 (1963), pp. 492–494.

Park et al., Jour. Amer. Chem. Soc. 74 (1952), pp. 2292–2294.

Groggins, Unit Processes in Organic Synthesis (1958), McGraw-Hill, New York, p. 210.

LEON ZITVER, Primary Examiner

H. T. MARS, Assistant Examiner

U. S. Cl. X.R.

424—342; 252—171, 364

PO-1050
(5/69)

UNITED STATES PATENT OFFICE
CERTIFICATE OF CORRECTION

Patent No. __3,527,814__    Dated __September 8, 1970__

Inventor(s) __L. S. Croix and A. J. Szur__

It is certified that error appears in the above-identified patent and that said Letters Patent are hereby corrected as shown below:

Col. 1, line 52, a -- ; -- should follow after the formula;
       line 56, after "difluoromethyl" insert -- ether --.

Col. 2, line 21, "$(CF_3)_2C-O$" should read -- $(CF_3)_2C=O$ --;
       line 44, "750" should read -- 760 --;
       line 49, "mols" should read -- mole --;
       line 50, "mols" should read -- mole --;
       line 57, "mols" should read -- mole --.

Col. 3, line 11, "liquds" should read -- liquids --;
       line 23, "$CF_3(CH_2Cl)CHOCH_2Cl$" should read
       -- $CF_3(CF_2Cl)CHOCH_2Cl$ --.

SIGNED AND
SEALED
DEC 1 1970

(SEAL)
Attest:

Edward M. Fletcher, Jr.
Attesting Officer

WILLIAM E. SCHUYLER, JR.
Commissioner of Patents